United States Patent
Vincent et al.

(10) Patent No.: US 7,669,640 B2
(45) Date of Patent: Mar. 2, 2010

(54) CASING WITH EXTERNAL SEAL AND IMMOBILIZATION COVER FOR A PASSENGER HEATING, VENTILATION AND/OR AIR CONDITIONING INSTALLATION

(75) Inventors: Philippe Vincent, Epernon (FR); Gilbert Terranova, Le Perray en Yvelines (FR); Thomas Carton, Maurepas (FR)

(73) Assignee: Valeo Climatisation S.A., Le Mesnil Saint Denis Cedex (FR)

( * ) Notice: Subject to any disclaimer, the term of this patent is extended or adjusted under 35 U.S.C. 154(b) by 1051 days.

(21) Appl. No.: 11/136,844

(22) Filed: May 25, 2005

(65) Prior Publication Data

US 2006/0000580 A1    Jan. 5, 2006

(30) Foreign Application Priority Data

Jun. 21, 2004    (FR) .................................. 04 06721

(51) Int. Cl.
  *B60H 1/00*    (2006.01)
  *F28F 7/00*    (2006.01)
  *F28F 9/00*    (2006.01)
(52) U.S. Cl. .............................. 165/41; 165/67; 165/78; 165/81; 165/149; 180/68.4
(58) Field of Classification Search .................... 165/41, 165/67, 72, 75, 78, 79, 73, 74, 81, 140, 148, 165/149, 157, 158, 173; 180/68.1, 68.4
See application file for complete search history.

(56) References Cited

U.S. PATENT DOCUMENTS

| | | | | |
|---|---|---|---|---|
| 4,401,157 A | * | 8/1983 | Cadars .......................... | 165/78 |
| 4,465,124 A | * | 8/1984 | Jacquet et al. ................. | 165/78 |
| 4,576,223 A | * | 3/1986 | Humpolik et al. ............. | 165/79 |
| 4,678,028 A | * | 7/1987 | Conant et al. ................. | 165/75 |
| 5,113,930 A | * | 5/1992 | le Gauyer ..................... | 165/78 |
| 5,180,005 A | * | 1/1993 | Marsais et al. ................ | 165/78 |
| 5,180,006 A | * | 1/1993 | Marsais et al. ................ | 165/78 |
| 5,297,624 A | * | 3/1994 | Haussmann et al. .......... | 165/79 |
| 5,348,079 A | * | 9/1994 | Tanaka ......................... | 165/79 |
| 5,381,858 A | * | 1/1995 | Fredrich ....................... | 165/79 |
| 5,662,162 A | | 9/1997 | Fukuoka et al. | |
| 5,819,841 A | * | 10/1998 | Moynat ........................ | 165/78 |
| 5,865,244 A | * | 2/1999 | Moser ......................... | 165/173 |

(Continued)

FOREIGN PATENT DOCUMENTS

DE    39 16 816    5/1990

(Continued)

*Primary Examiner*—Ljiljana (Lil) V Ciric
(74) *Attorney, Agent, or Firm*—Howard & Howard Attorneys PLLC

(57) ABSTRACT

A casing houses a heat exchanger in a vehicle HVAC system. The heat exchanger includes air inlet and air outlet faces, rear end and front end faces, and first and second side faces. The side faces are each capped with a radiator tank comprising a front end. Each radiator tank defines an orifice for connection to a heat transfer fluid supply circuit. The casing includes a front end wall defining an opening opposite the front end face of the heat-exchanger. The casing also includes a cover defining at least two passages adapted to suit the orifices of the radiator tanks and fixedly attached to the front end wall. The cover also includes seals for limiting the outlet of air via the opening and/or the passages.

15 Claims, 4 Drawing Sheets

U.S. PATENT DOCUMENTS

Figure 5:
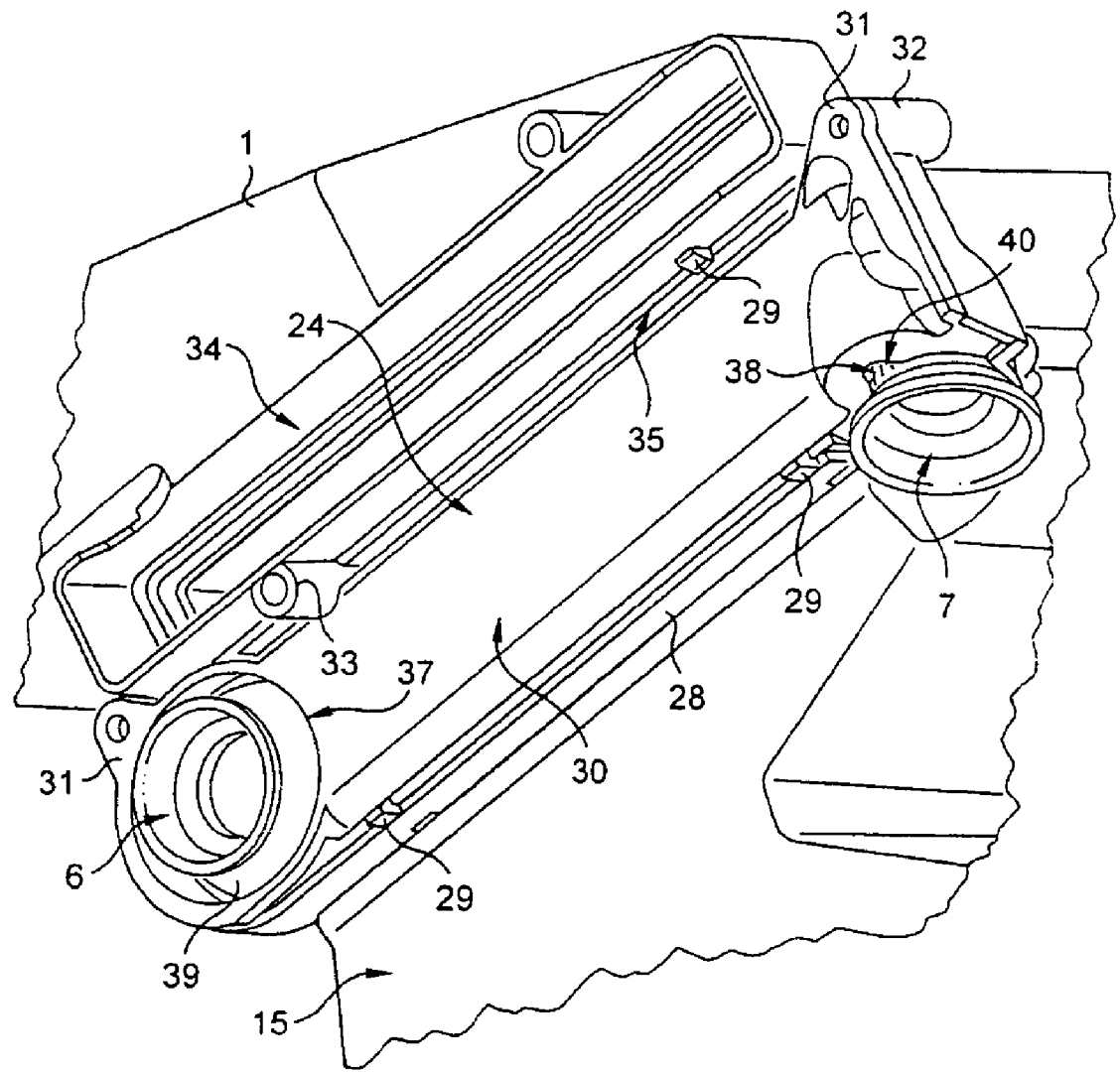

| | | | |
|---|---|---|---|
| 5,875,836 A * | 3/1999 | Nakamura | 165/78 |
| 5,947,190 A * | 9/1999 | Murase et al. | 165/78 |
| 5,975,193 A * | 11/1999 | Tokita et al. | 165/79 |
| 6,070,659 A * | 6/2000 | Hosoya | 165/78 |
| 6,082,446 A * | 7/2000 | Ahaus et al. | 165/149 |
| 6,189,801 B1 * | 2/2001 | Klingler et al. | 165/78 |
| 6,378,717 B1 * | 4/2002 | Reutter | 165/72 |
| 6,470,961 B1 * | 10/2002 | Case | 165/78 |
| 6,533,027 B2 * | 3/2003 | Gille et al. | 165/67 |
| 6,695,037 B1 * | 2/2004 | Humburg et al. | 165/75 |
| 6,904,965 B2 * | 6/2005 | Beck et al. | 165/153 |
| 7,172,014 B2 * | 2/2007 | Heine | 165/140 |
| 7,401,672 B2 * | 7/2008 | Kurtz et al. | 180/68.4 |

FOREIGN PATENT DOCUMENTS

FR    2 830 609    4/2003

* cited by examiner

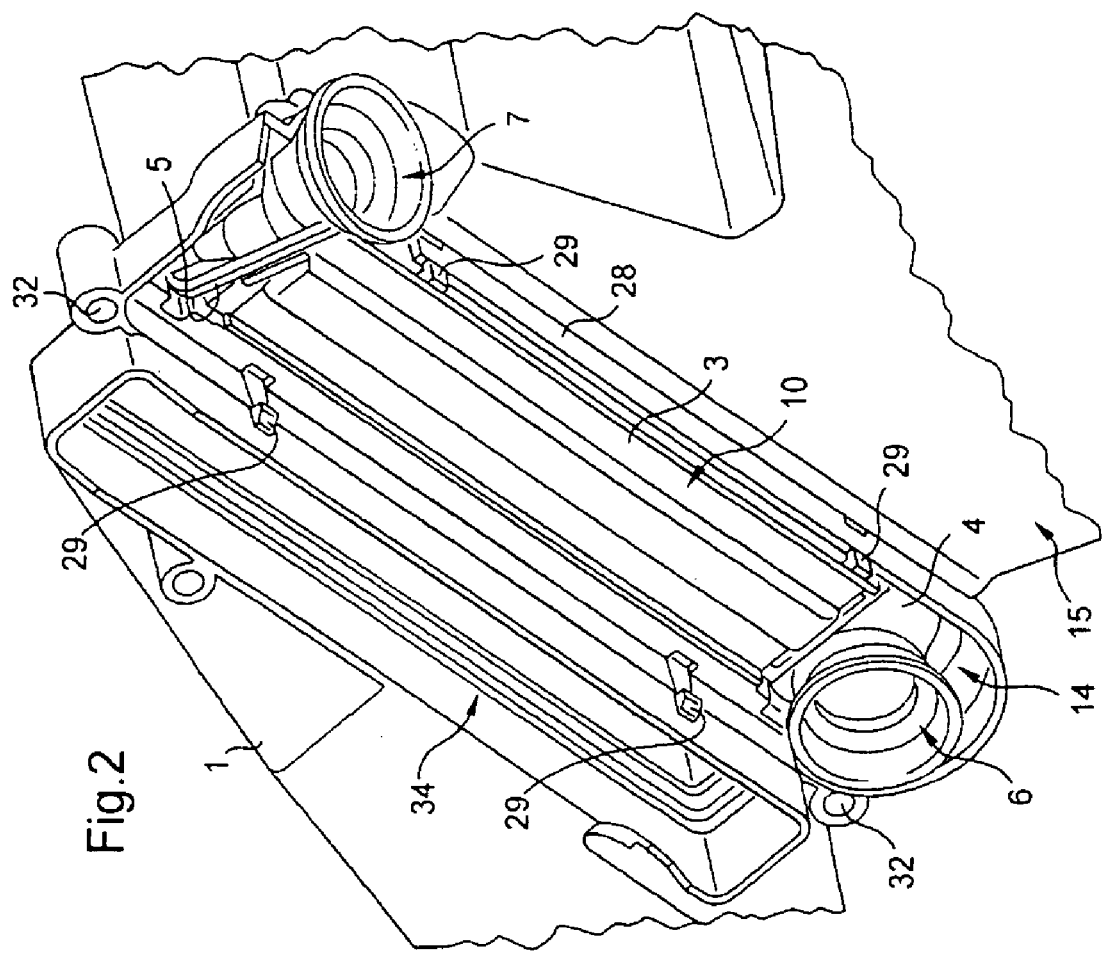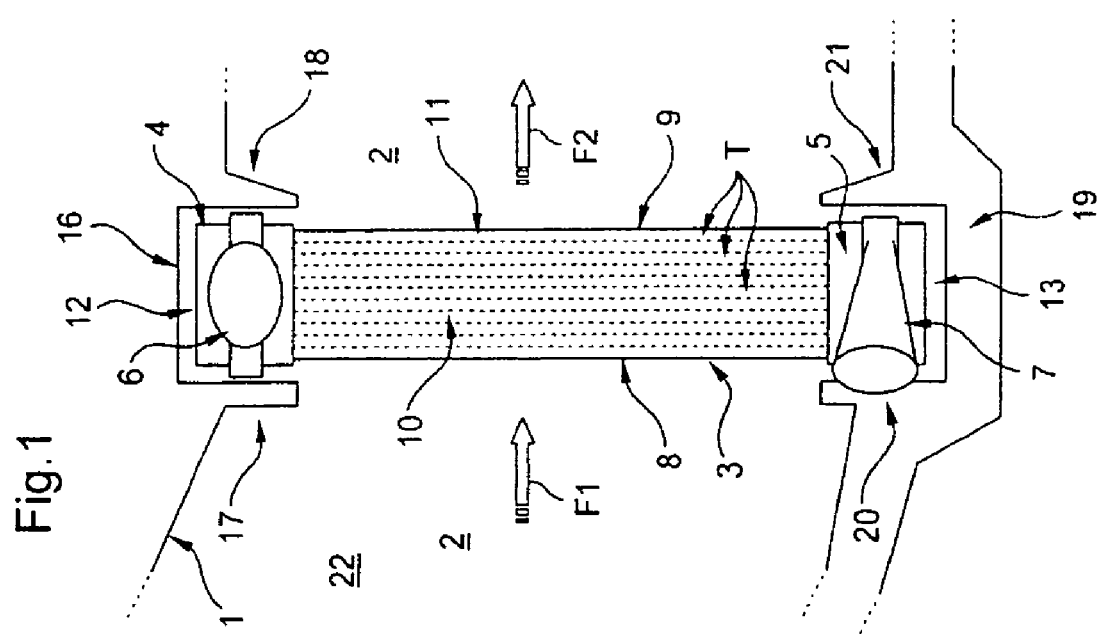

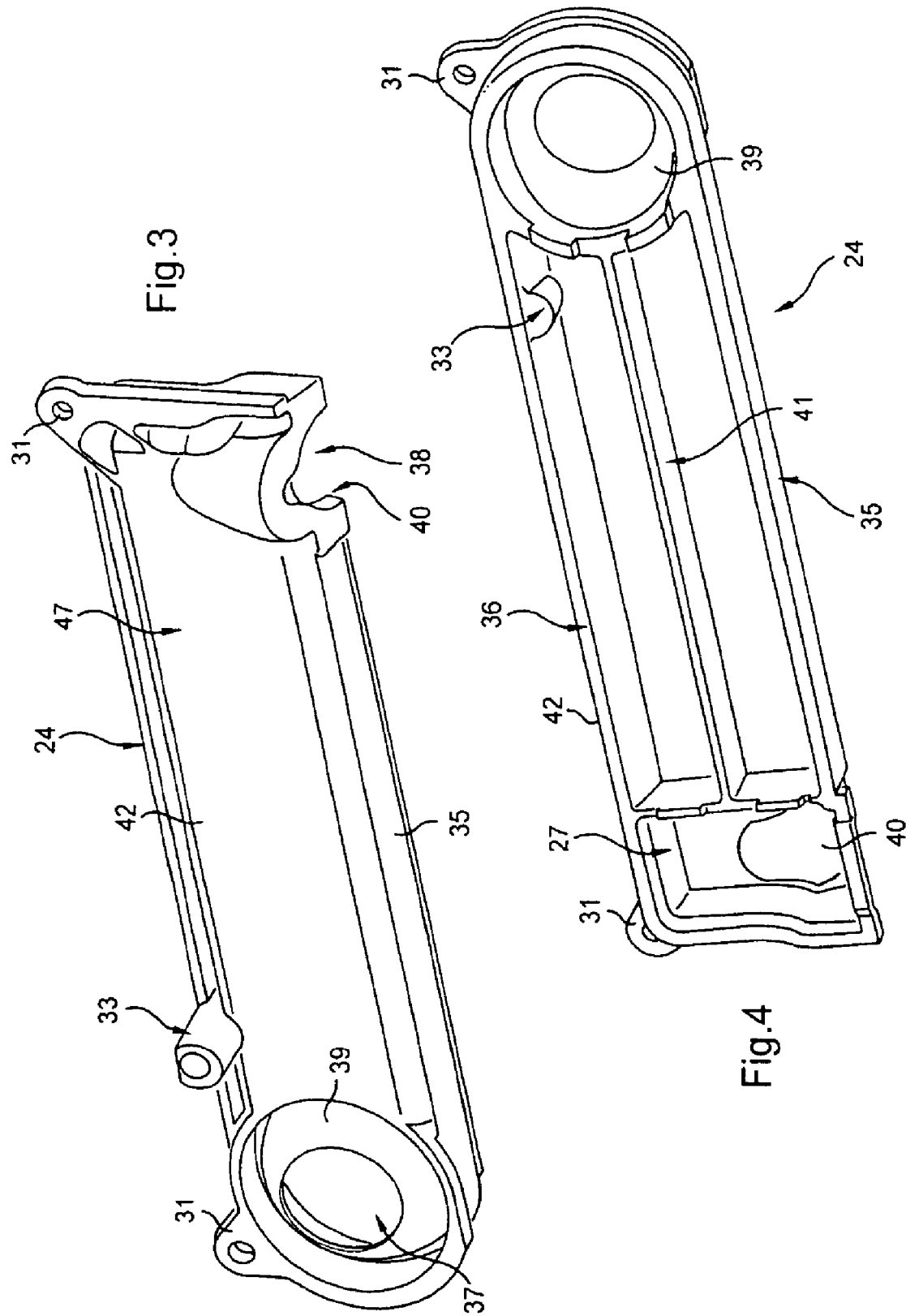

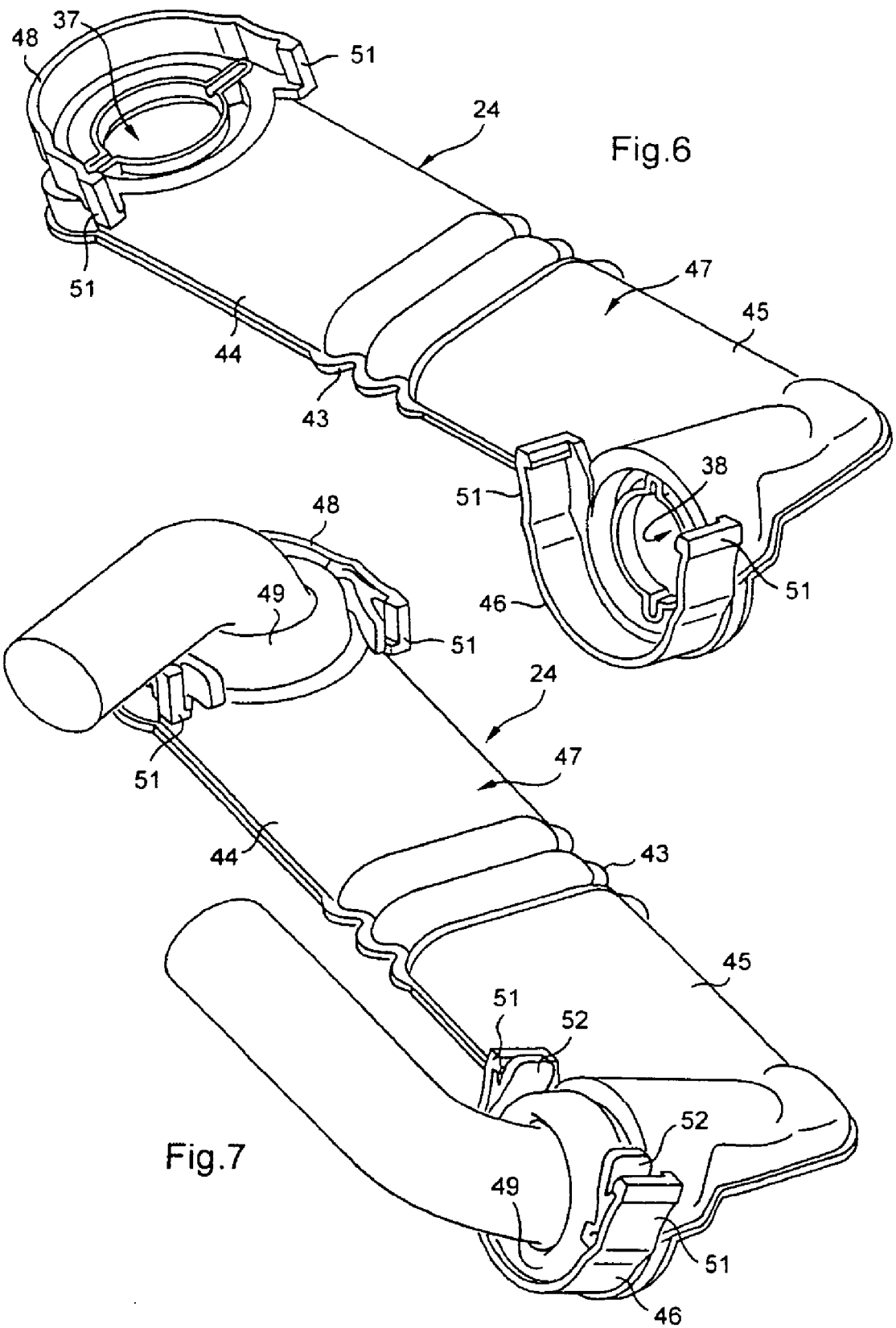

CASING WITH EXTERNAL SEAL AND IMMOBILIZATION COVER FOR A PASSENGER HEATING, VENTILATION AND/OR AIR CONDITIONING INSTALLATION

The invention relates to the field of passenger compartment heating, ventilation and/or air conditioning installations, particularly of motor vehicles, and more precisely the casings of such installations, intended to house a heat exchanger.

As is known to those skilled in the art, because of the production tolerances of heat exchangers, the housings intended to receive them within the casings of the aforementioned type are overdimensioned. This overdimensioning is particularly great when the heat exchanger is of the type called "I-flow", that is to say when it comprises two radiator tanks separated from one another by a core of tubes in which a heat transfer fluid circulates in a single direction.

A heat exchanger comprises air inlet and air outlet faces, rear end and front end faces, and first and second side faces each capped with a radiator tank (particularly in the case of I-flow), comprising a front end furnished with an orifice for connection to a heat transfer fluid supply circuit. The casing comprises a front end wall in which is defined an opening allowing the insertion (and the extraction) of the heat exchanger in transverse position in a treatment channel and through which emerges its front end face.

Because of the aforementioned overdimensioning, a part of the air flow which reaches the inlet face of the heat exchanger may exit from the casing via the passage defined in its front end wall. This escape of cold air to the outside of the casing induces a loss of thermal power and a lack of thermal comfort in the passenger compartment, usually around the legs of the driver and where appropriate those of the front passenger.

Furthermore, the overdimensioning induces a problem of immobilization of the heat exchanger inside the casing, in particular at its side faces.

To attempt to remedy these drawbacks, it has been proposed, on the one hand, to install steadying blocks made of elastic and compressible material inside the housing in which the radiator tanks are installed, and on the other hand, to install sealing means at least on the periphery of the passage defined on the front end wall of the casing. These steadying blocks and sealing means are usually fitted seals made of foam, for example of polyurethane (PU).

Thanks to these seals, a good external seal and a satisfactory immobilization may be provided in new condition. However, when these fitted seals age, their properties and performance tend to deteriorate (compaction, crumbling), so that they are no longer capable of providing the initial external seal and immobilization. This results in a loss of thermal power and hence a loss of thermal comfort inside the passenger compartment of the vehicle.

Furthermore, the installation of these seals, usually on the radiators, is not very ergonomic and is costly, given that it requires the manual intervention of a person.

It has also been proposed to use a cover to blank off a passage in a casing. However, the proposed cover does not make it possible, on the one hand, to achieve the seal with the casing at the inlet and outlet tubes of the heat exchanger, and on the other hand, to ensure this seal due to the production tolerances of the heat exchanger, when its radiator tanks are integrated into the casing. Furthermore, the installation of the cover requires the intervention of a person in order to manually attach fitted seals, made for example of PU.

The invention therefore aims to improve the situation, particularly in the case of I-flow heat exchangers.

For this purpose it proposes a casing, of the aforementioned type, for housing a heat exchanger in a heating, ventilation and/or air conditioning installation, particularly of a motor vehicle.

According to the invention, this casing comprises a cover, first comprising at least two passages adapted to suit the orifices of the heat exchanger, secondly intended to be placed against the front end face of the heat exchanger and to be fixedly attached to the front end wall, and thirdly, also comprising sealing means overmolded and responsible for limiting (and if possible eliminating) the outlet of air via the opening defined in the front end wall and/or via at least one of the passages.

The casing according to the invention may comprise complementary features which may be taken separately or in combination, and particularly:

- the cover may comprise a peripheral edge furnished on its inner face with a peripheral sealing band forming at least a part of the sealing means,
- at least one part of the sealing means may be arranged in order to espouse the contour of at least one part of each orifice. In this case, the sealing means are made of an elastic material,
- when a first passage leads entirely to the front end face of the heat exchanger, the part of the sealing means may define a first collar intended to tightly surround the first passage and the corresponding connection orifice,
- when a second passage leads entirely to the front end face of the heat exchanger, the part of the sealing means may define a second collar intended to tightly surround the second passage and the corresponding connection orifice,
- when a linking part of a second passage protrudes at the front end face of the heat exchanger, the part of the sealing means may define at least one band intended to tightly surround at least a portion of the linking part of the second passage,
- when each passage comprises a linking part protruding at the front end face of the heat exchanger, the part of the sealing means may define at least two bands each intended to tightly surround at least a portion of each of the linking parts of the passages,
- the sealing means may comprise at least one auxiliary band, for example substantially rectilinear,
- the cover may comprise a shell made of a first rigid or semi-rigid material, and the sealing means are overmolded on the shell and made of a second material having a greater elasticity and compressibility than those of the first material,
- the cover may comprise first and second half-shells some distance apart, made of a second rigid or semi-rigid material, and a first shell made of a first material having a greater elasticity and compressibility than those of the first material, defining the sealing means and fixedly attached to the inner face of the first and second half-shells,
- the cover may comprise an outer face furnished with first and second parts at least partially surrounding its passages and each defining auxiliary attachment means responsible respectively for fixedly attaching to the cover a connector of the heat transfer fluid supply circuit,
- the cover may comprise second attachment means allowing the fixed attachment of a fitted element. As a result, the casing may for example comprise a second opening through which emerges a front end face of an auxiliary heat radiator with positive temperature coefficient resistor (PTC resistor) forming the fitted element.

Other features and advantages of the invention will emerge on examination of the following detailed description, and of the appended drawings, in which:

FIG. 1 illustrates in schematic manner, in a view in partial section, a part of an example of a casing of a heating, ventilation and/or air conditioning installation fitted with an I-flow heat exchanger, FIG. 2 illustrates in schematic manner, in a top view, in perspective, a front end face of a heat exchanger, emerging via a passage defined in a casing according to the invention, before installation of a cover, FIG. 3 illustrates in schematic manner, in a view in perspective, the outer face of an example of a cover, FIG. 4 illustrates in schematic manner, in a view in perspective, the inner face of the example of a cover of FIG. 3, FIG. 5 illustrates in schematic manner, in a top view, in perspective, the casing of FIG. 2 fitted with the cover illustrated in FIGS. 3 and 4, FIG. 6 illustrates in schematic manner, in a view in perspective, the outer face of another example of a cover, before the fixed attachment to connectors of a fluid supply circuit, and FIG. 7 illustrates in schematic manner, in a view in perspective, the cover of FIG. 6, after the fixed attachment to the connectors of the fluid supply circuit.

The appended drawings may not only serve to supplement the invention, but also contribute to its definition, where appropriate.

Reference is made first of all to FIGS. 1 and 2 to describe an exemplary embodiment of an air flow treatment casing 1, according to the invention, of a heating, ventilation and/or air conditioning installation, for example of a motor vehicle passenger compartment.

The casing 1 may be installed in any part of the vehicle (front, rear, or other).

The casing 1 (very partially illustrated) is for example intended to heat an air flow originating from outside the passenger compartment and/or from inside the latter, in order to supply the vehicle's passenger compartment with warm air. For this purpose, its external and internal walls (partially represented) delimit a heating channel 2 in which is installed a heat exchanger 3, like for example a heating radiator with fluid circulation.

In the following description, it is taken as a nonlimiting example that the heat exchanger is an "I-flow" radiator.

It should be noted that an I-flow heat exchanger 3 comprises two radiator tanks 4 and 5 separated from one another by a core of tubes T in which a heat transfer fluid circulates in a single direction. Consequently, one of the radiator tanks, for example the one referenced 4, comprises an orifice (where necessary shaped) 6 forming a supply inlet intended to be connected to an external heat transfer fluid supply circuit, and the other tank, for example the one referenced 5, comprises another orifice (where necessary shaped) 7 forming an outlet intended to be connected to the external circuit.

In the example illustrated in FIGS. 1 and 2, each radiator tank consists of two complementary parts.

Naturally, however, each radiator tank could consist of a single part. The radiator 3 comprises:

an air inlet face 8 through which the air flow to be treated (heated) F1 enters, an air outlet face 9 through which the treated (heated) air flow F2 emerges, a front end face 10 and rear end face 11 (FIG. 1 being a top view, the front end face 10 is superposed on the rear end face 11, so that the latter 11 is not visible), a first side face 12 (placed perpendicular to the plane of the sheet containing FIG. 1) capped with the first radiator tank 4, and a second side face 13 (placed perpendicular to the plane of the sheet containing FIG. 1) capped with the second radiator tank 5.

The radiator 3 is installed transversely in the heating duct 2 of the casing 1, the ends of its radiator tanks 4 and 5 containing the supply inlet 6 and the outlet 7, leading to the outside of said casing 1 for the purpose of connection to the external supply circuit. In the example illustrated, the supply inlet 6 is formed at the front end face 10, while the outlet 7 is formed in the top part of the inlet face 8, that is to say virtually on the front end face 10. More precisely, the outlet 7 extends in a general direction situated between a plane parallel to the inlet face 8 and a plane parallel to the front end face 10 (in other words, the outlet (or tube) 7 is positioned obliquely). The inverse situation is also possible. It is also possible for the supply inlet 6 and the outlet 7 to be both formed on the front end face 10, or both formed in the top part of the inlet face 8 or of the outlet face, that is to say virtually on the front end face 10.

In order to allow the radiator 3 to be installed in a transverse position, the casing 1 comprises an opening 14 defined in a front end wall 15 and side walls 16, 17 and 18 on the one hand, and 19, 20 and 21 on the other hand, defining two housings intended respectively to receive at least one part of one of the radiator tanks 4 and 5. The radiator 3 may thus be installed in the heating duct 2 by inserting its radiator tanks 4 and 5 into their respective housings then translating them until they abut against the rear end wall 22 of the casing 1, intended to be placed opposite its rear end face 23.

When the radiator 3 has been installed in the heating duct 2, its front end face 10 is substantially opposite the front end wall 15, as illustrated in FIG. 2, at the opening 14 which is defined therein.

The housings receiving the radiator tanks 4 and 5 and the opening 14 are overdimensioned in order to take account of the production tolerances of the radiator 3. Because of this overdimensioning, a part of the incoming air flow F1 may exit from the heating duct 2 in the free space situated between the edge which delimits it and the radiator 3. The dimensional constraints of the radiator impose an easily adaptable cover.

The invention proposes at least to seal in original manner and durably over time the aforementioned free space. To do this, it proposes to add to the casing 1 a cover 24 of the type illustrated as a nonlimiting example in FIGS. 3 and 4, and intended to be placed against the front end face 10 of the radiator 3, when the latter has been installed in the heating channel 2, and to be fixedly attached to the front end wall 15 for the purpose of immobilizing said radiator 3.

More precisely, the cover 24 comprises at least two passages 25 and 26 adapted to suit the supply inlet 6 and outlet 7 of the radiator 3 and an inner face 27 furnished in chosen locations with sealing means responsible for limiting, and preferably eliminating, the exit of air through the opening 14 defined in the front end wall 15, when it has been fixedly attached to the latter.

The cover 24 may be fixedly attached to the front end wall 15 in various ways. For example, as illustrated in FIGS. 2 to 4, the opening 14 may be delimited on its periphery by a peripheral edge 28 furnished with first attachment lugs 29 each comprising, for example, a head shaped in a manner to immobilize the outer face 30 of the cover 24 (or as a variant to interact with shaped housings having shapes to match those of the first attachment lugs). Here, four first attachment lugs 29 have been represented furnished with a beveled head, but their number may be fewer or more than four. In addition, other types of attachment means, particularly with shape interaction, may be envisaged.

Complementary attachment means may also be provided in order to reinforce the fixed attachment. Thus, as shown in FIGS. 2 to 4, there may be provided on the one hand on the cover 24 one or more second attachment lugs 31 each furnished with a through hole, and on the other hand, on the front end wall 15 (for example on the peripheral edge 28) one or more threaded holes 32 (equal in number to the number of second attachment lugs 31). Each threaded hole 32 is intended to be placed opposite a through hole of one of the second attachment lugs 31 and to receive the threaded part of a fastening means (not shown), such as for example a screw or a bolt.

Naturally, it may be envisaged to use as attachment means only the second attachment lugs 31, the threaded holes 32 and the screws.

The cover 24, as illustrated in FIGS. 2 to 4, may also be furnished, preferably on its outer face 30, with auxiliary attachment means 33 intended to allow a fitted element to be fixedly attached to the front end wall 15 via said cover 24. For example, the casing 1 may comprise, at its front end wall 15 and beside the opening 14, a second shaped opening 34 allowing the installation in the heating duct 2, downstream of the radiator 3, of a fitted element, such as a top-up heat radiator with positive temperature coefficient resistor (PTC resistor), not shown.

Naturally other types of auxiliary attachment means may be envisaged to fixedly attach a fitted element to the front end wall 15 of the casing 1 via the cover 24.

The cover may be made in different ways, in order to ensure at least the external seal of the radiator 3 at the opening 14, and preferably the immobilization of the radiator 3 in the heating duct 2, by taking up the play.

For example, the peripheral edge 35 of the cover 24 may be provided, on its inner face 27, with a peripheral sealing band 36, as illustrated in FIG. 4.

Then, also as illustrated in FIG. 4, the inner face 27 of the cover 24 may comprise sealing means at the two shaped parts defining the two shaped passages 37 and 38. In the case of a radiator 3 comprising an axial conical supply inlet 6 and a lateral conical outlet 7, the sealing means that are fixedly attached to the shaped part defining the shaped passage (or opening) 37, placed against the supply inlet 6, are preferably in the form of a substantially conical collar 39, while the sealing means that are fixedly attached to the shaped part defining the shaped passage (or deformation) 38, placed against the outlet 7, are in the form of a band or more preferably in the form of a semi-conical demi-collar 40.

The conicity of the collar 39 is used to maintain a good level of seal despite the dimensional dispersions of the heat exchangers.

Naturally, in the presence of a lateral conical supply inlet 6 and outlet 7, their sealing means are all in the form of a band or more preferably of a semi-conical demi-collar 40. Likewise, in the presence of an axial conical supply inlet and outlet 7, their sealing means are all preferably in the form of a conical collar 39.

These collar and demi-collar shapes offer a quality seal at the supply inlet 6 and outlet 7 of the radiator 3, when the cover 24 is pressed against its front end face 10.

The interaction between the cover 24 and the casing 1, particularly at the (oblique) outlet 7, also helps to immobilize the radiator 3. Specifically, the latter is wedged and can no longer move laterally.

The seal may be further reinforced by providing on the inner face 27 of the cover 24 at least one longitudinal and central sealing band 41, as illustrated in FIG. 4.

Naturally, any other form of sealing means, of the type to allow a quality seal at the opening 14, defined in the front end wall 15, may be envisaged, and particularly one or more transverse sealing bands, perpendicular to the longitudinal and central sealing band 41. These forms depend mainly on the arrangement of the front end face 10 of the radiator 3.

In order to ensure not only the external sealing of the radiator 3, but also its lateral immobilization (between the side walls 16 and 19 of the casing 1) and its vertical immobilization (between the rear end wall 22 of the casing 1 and the inner face 27 of the cover 24), once the cover 24 is fixedly attached to the front end wall 15 of the casing 1 (as illustrated in FIG. 5), the sealing means are preferably made of a material having a chosen elasticity and compressibility. The lateral immobilization is more precisely provided by the joint actions of the attachment means 29, 31 and 32 and of the compressed collar 39 and demi-collar 40. The vertical immobilization is more precisely provided by the joint actions of the attachment means 29, 31 and 32, the compressed sealing bands 36 and 41 and the compressed collar 39 and demi-collar 40.

These sealing means are preferably made of long-lasting elastomer, such as for example a thermoplastic elastomer of the SEBS or EPDM type. They are totally or partially defined by overmolding, here of the inner face 27, of a rigid or semi-rigid shell 42, for example made of PVC, PE, PA or PP. Thus, the collar 39, the demi-collar 40 and the peripheral sealing band 36 and central sealing(s) band 41 may be made for example by overmolding on the shell 42.

"Overmolding" here means the local injection of a flexible material in a predetermined operation and in predetermined zones. The fixed attachment may be achieved mechanically or by heat-fusion. The overmolding is advantageous because it does not require human intervention. Specifically, a first press injects a rigid material into a mold, then a robot takes the piece thus formed in order to place it in another mold into which the flexible material is injected in all the zones in which a seal is required. Thus, it is possible to produce in two operations a complete cover which normally requires four or five operations (molding, bonding, assembly of a first PU peripheral seal, assembly of a second seal for the orifices, etc.).

In the foregoing, embodiments of a cover 24 have been described in which the sealing (and immobilization) means have been defined only in certain chosen zones of the inner face 27 of the cover 24. But, it is possible to envisage embodiments in which the sealing means cover the whole of the inner face 27 (and/or of the outer face) of the cover 24.

More precisely, in this example, the cover 24 comprises, on the one hand, a first shell 43 made of a first material having a chosen elasticity and compressibility, defining all the sealing means, and on the other hand, first 44 and second 45 half-shells at some distance, made of a second rigid or semi-rigid material, and fixedly attached to the outer (or top) face of the first shell 43. The elasticity and compressibility of the first material are chosen to be greater than those of the second material.

Here, the cover 24 is therefore made up of the combination of the first shell 43 and the first 44 and second 45 half-shells.

The link between the two half-shells 44 and 45 being provided by the first flexible shell 43, the cover 24 has a central flexibility and elasticity which allow it also to take up the differences of height between the front ends of the two radiator tanks 4 and 5 and to take up the considerable differences of relative positioning between the supply inlet 6 and the outlet 7. This also makes it possible to articulate the cover in an L-shape in order to attach first a complementary shaped part 46 (to which the description will return hereinafter), then to return the part of the cover comprising the half-shell 44 toward the passage 25.

Instead of two half-shells fixedly attached to the first shell 43 (defining the sealing (and immobilization) means), it is possible to envisage a single second shell, rigid or semi-rigid, fixedly attached to said first shell 43. However, in this case there is no longer a central flexibility and elasticity.

In these two latter embodiments, the first shell 43 may be fixedly attached to the two half-shells 44 and 45 (or to the second shell) by bonding or by overmolding. Furthermore, as is illustrated in FIGS. 6 and 7, the cover 24 may comprise on its outer face 47 two complementary shaped parts 48 and 46 at least partially surrounding its adapted passages 25 and 26. Each of these complementary parts 48 and 46 comprises auxiliary attachment means responsible for fixedly attaching to the cover 24 one of the two connectors 49 and 50 of the heat transfer fluid supply circuit. For example, and as illustrated, each complementary part 48, 46 is arranged in the form of a semi-circular wall furnished at each of its two flexible ends with a first shape-interaction attachment means 51 intended to interact with one of the two second shape-interaction attachment means 52 installed on the connectors 49 and 50.

The sealing means are, as described hereinabove, preferably overmolded on the inner face of the cover 24. However, this is not a requirement. Specifically, they may be overmolded on the outer face of the cover or on its edge.

The invention is not limited to the casing embodiments described hereinabove, only as examples, but it covers all the variants that those skilled in the art might envisage in the context of the claims hereinafter.

The invention claimed is:

1. An HVAC assembly comprising:
   a heat exchanger (3) comprising
     an air inlet face (8),
     an air outlet face (9),
     a rear end face (11),
     a front end face (10), and
     first (12) and second (13) side faces;
   a radiator tank (4, 5) comprising a front end and defining orifices (6, 7) for connection to a heat transfer fluid supply circuit; and
   a casing (1) for housing said heat exchanger, said casing (1) comprising
     a front end wall (15) defining an opening (14) opposite said front end face (10) of said heat exchanger (3), and
     a cover (24) defining at least two passages (37, 38) adapted to suit said orifices (6, 7),
     said cover placed against the front end face (10) of said heat exchanger (3) and fixedly attached to said front end wall (15),
     said cover comprising sealing means (39, 40, 36, 41) for limiting the outlet of air via said opening (14) and/or via at least one of said at least two passages (37, 38), and
   said cover (24) comprises a shell (42) made of a first material, and wherein said sealing means (39, 40, 36, 41) are overmolded on said shell (42) and made of a second material having a greater elasticity and compressibility than those of the first material.

2. The assembly according to claim 1, characterized in that at least one part of said sealing means (39, 40) is arranged to espouse the contour of at least one part of each passage (37, 38), and in that said sealing means (39, 40) are made of an elastic material.

3. The assembly according to claim 2, characterized in that a linking part protrudes from said cover into a second (38) of said passages for engaging said front end face (10) of said heat exchanger (3), and in that said at least one part of said sealing means (39, 40) defines at least one band (40) surrounding at least a portion of said linking part of said second passage (38).

4. The assembly according to claim 2, characterized in that said cover comprises a linking part protruding into each passage (37, 37) for engaging said front end face (10) of said heat exchanger (3), and in that said part of the sealing means defines at least two bands (40) each surrounding at least a portion of each of said linking parts of said passages (37, 38).

5. The assembly according to claim 2, characterized in that said cover (24) comprises a peripheral edge (35) furnished with a peripheral sealing band (36) forming at least one part of said sealing means.

6. The assembly according to claim 2, characterized in that said sealing means comprise at least one auxiliary band (41).

7. The assembly according to claim 2, characterized in that a first (37) of said passages leads entirely to said front end face (10) of said heat exchanger (3), and in that said at least one part of said sealing means (39, 40) defines a first collar (39) surrounding said first passage (37) and one of said orifices (6).

8. The assembly according to claim 7, characterized in that a second (38) of said passages leads entirely to said front end face (10) of said heat exchanger (3), and in that said at least one part of said sealing means (39, 40) defines a second collar surrounding said second passage (38) and another of said orifices (7).

9. The assembly according to claim 7, characterized in that a linking part protrudes from said cover into a second (38) of said passages for engaging said front end face (10) of said heat exchanger (3), and in that said at least one part of said sealing means (39, 40) defines at least one band (40) surrounding at least a portion of said linking part of said second passage (38).

10. The assembly according to claim 1, characterized in that said cover (24) comprises a peripheral edge (35) furnished with a peripheral sealing band (36) forming at least one part of said sealing means.

11. The assembly according to claim 1, characterized in that said sealing means comprise at least one auxiliary band (41).

12. The assembly according to claim 1, characterized in that said cover (24) comprises attachment means (33) for allowing the fixed attachment of a fitted element.

13. The assembly according to claim 12, characterized in that said casing defines a second opening (34) for accommodating a front end face of an auxiliary heat radiator and wherein a positive temperature coefficient resistor (PTC resistor) forms said fitted element.

14. An HVAC assembly comprising:
   a heat exchanger (3) comprising
     an air inlet face (8),
     an air outlet face (9),
     a rear end face (11),
     a front end face (10), and
     first (12) and second (13) side faces;
   a radiator tank (4, 5) comprising a front end and defining orifices (6, 7) for connection to a heat transfer fluid supply circuit; and a casing (1) for housing said heat exchanger, said casing (1) comprising
- a front end wall (15) defining a first opening (14) opposite said front end face (10) of said heat exchanger (3), and
- a cover (24) defining at least two passages (37, 38) adapted to suit said orifices (6, 7), wherein said cover placed against the front end face (10) of said heat exchanger (3) and fixedly attached to said front end wall (15), said cover comprising sealing means (39, 40, 36, 41) for limiting the outlet of air via said opening (14) and/or via at least one of said at least two passages (37, 38), and said cover (24) comprising attachment means (33) for allowing the fixed attachment of a fitted element; and wherein said casing defines a second opening (34) for accommodating a front end face of an auxiliary heat radiator and wherein a positive temperature coefficient resistor (PTC resistor) forms said fitted element.

15. The assembly according to claim 14, characterized in that said cover (24) comprises a shell (42) made of a first material, and in that said sealing means (39, 40, 36, 41) are overmolded on said shell (42) and made of a second material having a greater elasticity and compressibility than those of the first material.

* * * * *